United States Patent [19]

Hatridge

[11] 3,931,755

[45] Jan. 13, 1976

[54] PUMP

[76] Inventor: Frank J. Hatridge, 5115 N. 16th St., Omaha, Nebr. 68110

[22] Filed: May 28, 1971

[21] Appl. No.: 148,155

[52] U.S. Cl. .................... 92/155; 92/168; 417/437

[51] Int. Cl. .................... F01b 31/10; F16j 15/18

[58] Field of Search ............... 92/168, 162; 417/437

[56] References Cited

UNITED STATES PATENTS

| | | | |
|---|---|---|---|
| 2,330,781 | 9/1943 | Langmyhr et al. | 92/168 |
| 2,630,757 | 3/1953 | Cartier | 417/568 |
| 2,837,898 | 6/1958 | Ahlstrand | 92/155 |
| 2,888,879 | 6/1959 | Gaarder | 92/155 |
| 2,898,867 | 8/1959 | Saalfrank | 417/458 |
| 3,019,739 | 2/1962 | Prosser | 92/168 |
| 3,039,834 | 6/1962 | Howe | 92/155 |
| 3,053,596 | 9/1962 | Farmer et al. | 92/155 |
| 3,145,629 | 8/1964 | Gattzmann | 92/155 |
| 3,203,357 | 8/1965 | Delorme | 417/458 |
| 3,330,217 | 11/1967 | Baur et al. | 92/168 |
| 3,424,092 | 1/1969 | Hortuet | 417/401 |

*Primary Examiner*—William L. Freeh

[57] ABSTRACT

A pump having a piston tip member which fits a cylinder bore sufficiently loosely that abrasive particles in fluid being pumped do not excessively wear away the cylinder walls and piston tip member, the fit being sufficiently close, however, as to provide substantial and effective pump pressure, the liquid that by-passes the tip member being retained by a sealing assembly surrounding the piston rod for assuring that substantially all of it returns to the forward side of the piston during a return stroke.

A paint spraying assembly using the pump described.

5 Claims, 8 Drawing Figures

PUMP

FIELD OF THE INVENTION

This invention is in the field of pumps and also in the field of paint spraying equipment.

DESCRIPTION OF THE PRIOR ART

The oldest conventional way of spraying paint was by sucking it up into a passing air stream and blowing the air and paint together toward the work, with the disadvantage that a large part of the paint flies around in the air, not even reaching the work.

The flying paint is not only a health hazard to a workman, but has the more immediate economic disadvantage that it wastes costly paint.

The reason such prior art admixed air spraying systems have so much waste is because they require high pressure, even 1600 pounds per square inch. This great pressure causes paint to drift off in waste, contaminating the air, sometimes large quantities of it drying in the air, and never reaching the work.

Diaphragm-type paint pumps have been proposed. However, these have the disadvantage that it has not been possible to find a material that will not rupture.

Ruptured diaphragms are a major cause of "down time" during which a diaphragm pump is out of use while needing or receiving replacement of its diaphragm. A diaphragm pump will pump paint that is not admixed with air as would be extremely important if it could be achieved in a pump that would not be subject to such frequent breakdowns.

Conventional spraying equipment of the type described requires giant air compressors sometimes for achieving 600 pounds per square inch of pressure; such compressors are expensive and bulky, requiring for their hauling a truck up to 3-ton rating.

Attempts made to pump paint without a diaphragm, without compressed air, and in a common piston-type pump have failed in the prior art because the metal in the paint particles tends to wear away the cylinder walls and the outer surfaces of the piston assembly so fast as to promote breakdown. And so piston pumps of the orthodox type have not been practical for pumping abrasive paint.

Prior art attempts to use gear pumps to gain even flow has also shown the wear to be excessive when pumping abrasive paint.

Prior art compressed air paint spraying equipment has had the problem of frequent clogging in conventional equipment which is caused by paint drying in the equipment.

Heretofore in order to pump thinner through a conventional spraying machine in order to clean it, it has been necessary to shift bulky parts from a can of paint to the top of a can of cleaning solution. The laziness and inertia of workers to carry out this operation has resulted in the drying of paint in a machine, which can begin within minutes after the paint sprayer has been shut down, whereby air can enter it.

It has been necessary with conventional sprayers of the air compressor type to transfer paint from containers in which it is delivered over into a container of a special size adapted to receive on its top portions of the spraying equipment, as is time consuming.

SUMMARY OF THE INVENTION

A pump having a particular unorthodox special piston fit sufficiently loose as to result in long pump life without breakdown from wear due to abrasive particles in the liquid being pumped, the unorthodox piston fit being sufficiently close, however, as to provide substantial and effective pump pressure, the unorthodox fit resulting further in a by-passing of the tip member by material being pumped, and effective sealing means surrounding the piston rod and sealing well enough to assure the return on a return stroke of substantially all paint which is behind the piston to the forward end of the piston, all making practical the commercial pumping of materials containing abrasive matter without excessive wear, making it possible to provide a paint spraying assembly utilizing the pump, such assembly being so small that it can be carried in less than one-half of the volume of a trunk of a common passenger car even though having as high or higher a rate of paint delivery in terms of gallons per minute as a paint spraying assembly requiring a hauling truck up to 3-ton, the pump giving a substantially even rate of paint flow without excessive pulsation.

A paint spraying assembly using the pump described, the size of a spray gun of the assembly and of all parts of the assembly being coordinated with the number of piston strokes per minute, the length of the piston strokes, and the size of the parts of the pump, so as to deliver paint in a practical amount and with sufficient pulsation for effective paint spraying.

The pump achieving an even rate of flow through the unique combination of an unusually short piston stroke and multiple synchronized cylinder assemblies, partially due, I believe, to the high frictional resistance involved in pushing quantities of paint at high speed through the pump and lines which characterizes conventional paint pumps. It is an object to reduce the piston stroke drastically and to utilize multiple intermittent piston strokes in quick succession, whereby each stroke pushes at high speed only a minimum quantity of paint, whereby the area of frictional contact between the paint directly in front of the piston and moved speedily, is lesser than the greater frictional area of contact of the much greater amount of fast moved paint which is disposed in front of a conventional pump piston having long stroke.

The pump making possible a spraying assembly with increased service life of spraying equipment by eliminating costly maintenance of air compressors, air tanks, air sealed paint buckets, and other interconnecting parts by eliminating wear on these elements.

It is, therefore, an object of this invention to provide a sprayer which can be made in the total weight of approximately 70 pounds and yet able to accomplish the same rate of spraying done by an assembly of equipment that is three to five times as heavy, when such conventional assemblies include air compressor, air hose, and pump.

The pump described having short, quick strokes so that it does not require a bulky pressure accumulator or air chamber to absorb pulsations in order to even the flow, whereby this further piece of bulky equipment is eliminated.

Another object is to provide a paint sprayer which is easily maintained because of a greater ease in the pumping of thinner through it for cleaning, for eliminating the frequent clogging in the prior art.

Another object is to provide a machine that can be cleaned by simply shifting an intake hose from a paint bucket to a cleaner bucket with such ease as to induce workers to clean the machine.

Still another object is to provide a spraying machine which is small and so can be easily moved up and down stairs so as to eliminate the extremely long hoses necessary with conventional machines of equivalent paint out-put rating.

It is an object of this invention to provide a new sprayer which can use the paint directly out of the original delivery container by the simple introduction of a hose, saving time.

The piston sealing means comprising a counterbore in the outer end of the piston rod receiving bore, a plurality of annular sealing members disposed around the piston rod and receiving support from an annular shoulder formed by the counterbore, annular plug means in the outer end of the counterbore receiving the piston rod therethrough, at least some of the sealing members being V-shaped on any side whereby pressure from the plug toward the shoulder compresses the V-shaped sealing members for causing them to press against the wall of the counterbore and against the piston rod for gaining an effective sealing.

DESCRIPTION OF THE PREFERRED EMBODIMENT

Figure 1:
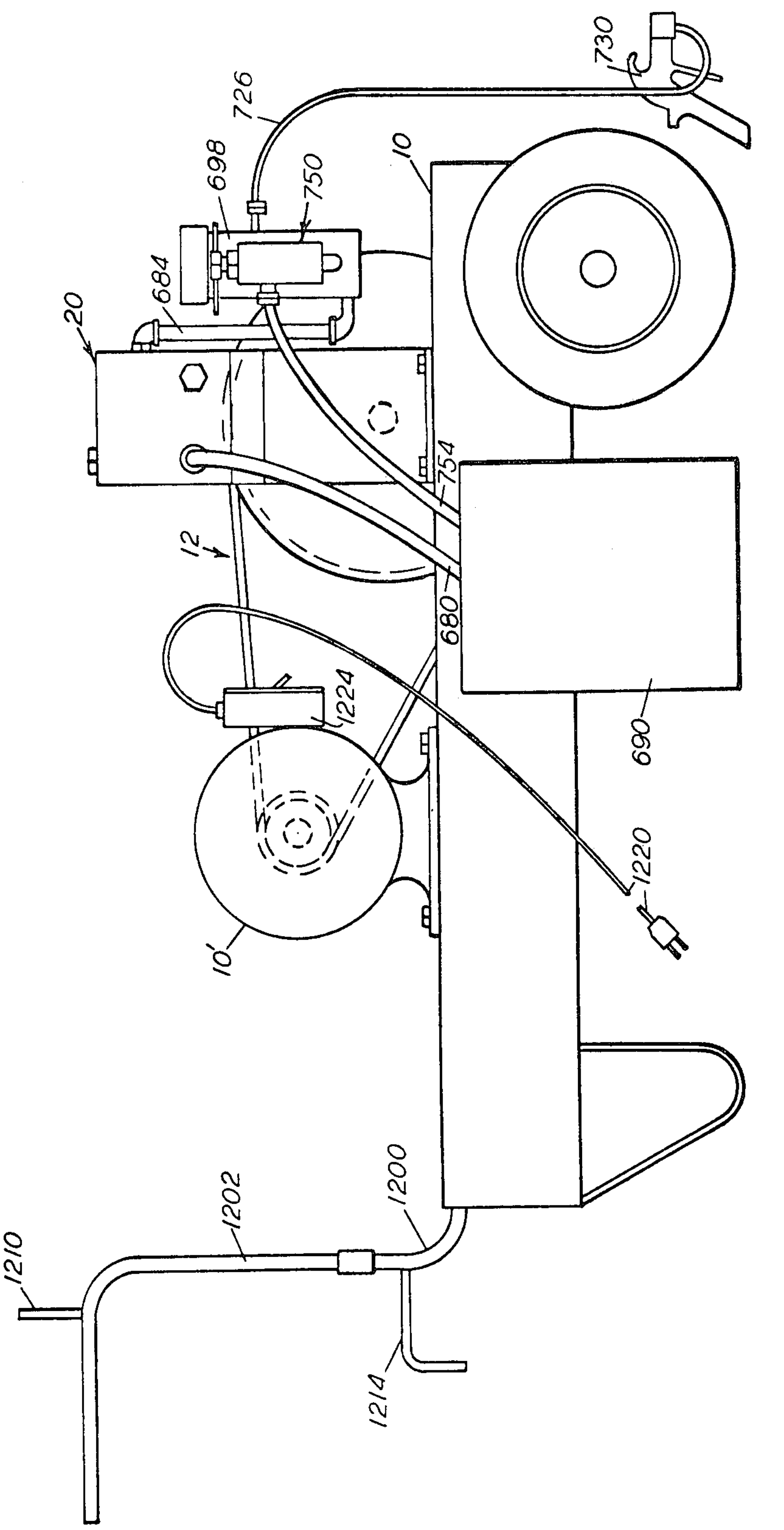
FIG. 1 is a side elevation of the pump of this invention shown as mounted on a paint sprayer.
Figure 2:
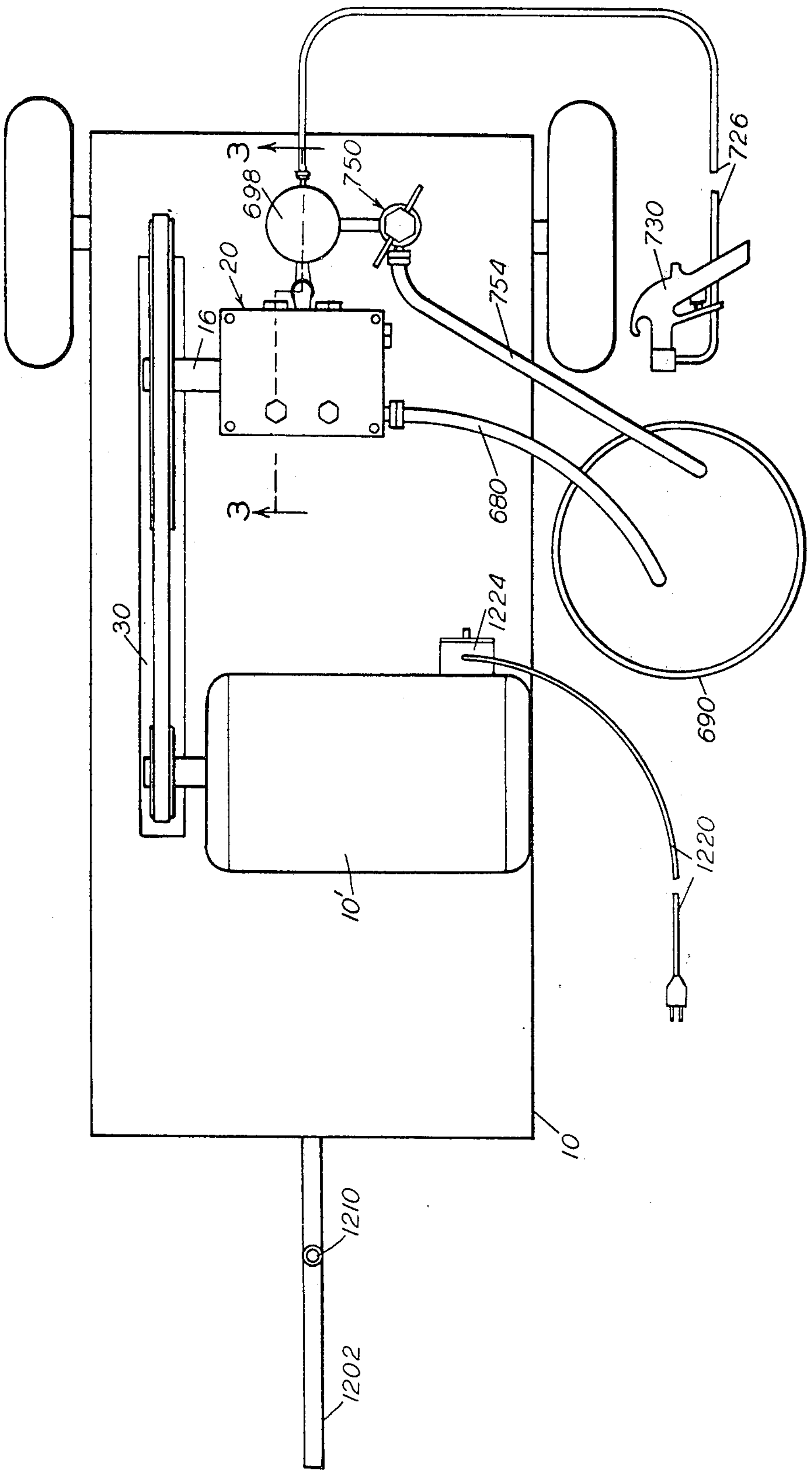
FIG. 2 is a top plan view of the sprayer.

Referring to the drawings for a more particular description, and first to FIG. 1, we see there a cart 10 on which the invention is adapted to be carried.

On the top of the cart the paint the paint sprayer is mounted and is generally indicated at 12 and comprises a motor 10' disposed in driving relation with the shaft 16 of a pump 20 by means of a belt and pulley assembly 30.

Figure 3:
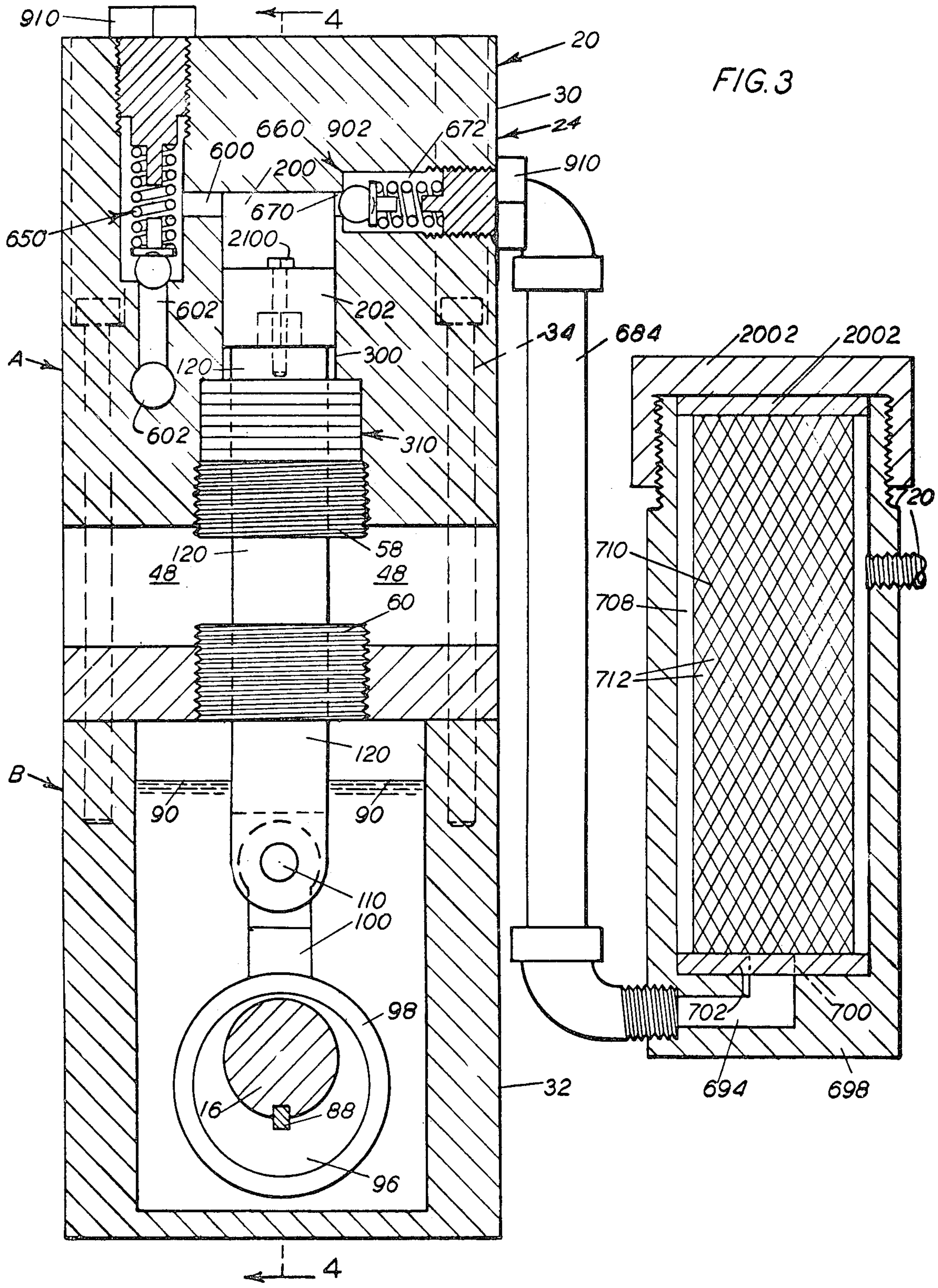
FIG. 3 is a sectional view taken along the line 3—3 of FIG. 2.

The pump 20, as best seen in FIG. 3, has a housing generally indicated at 24 which itself is formed of an upper housing or valve block 30 and a lower housing or valve block 32. The valve blocks 30 and 32 are held together by bolts 34 and 36 which are shown in dotted lines in FIGS. 3 and 4 and in full lines in FIG. 5.

I had always been told that the piston of a pump must have good fit and close tolerance with the cylinder walls. All texts explain that this is to prevent material being pumped from going past the piston and causing a pressure resisting the return stroke of the piston. Such unwanted pressure being called "back pressure". Such back pressure becomes great when air behind a cylinder is compressed to the maximum, then the piston is locked and parts break or else belt drive slips. At the least, such a pump would be inoperable.

It is a new concept of my pump to provide a piston that loosely fits the cylinder wall whereby, although paint can pass freely around the piston, yet during a return stroke the paint is equally free to pass around the piston for avoiding back pressure and become locked.

Still another object is to provide an arrangement of seals tightly fitting the reciprocating piston rod with a much closer fit because of packing by a threaded plug, than the loose fit of the piston itself, whereby there is no leakage and the only fluid passage from behind the piston that is possible is thereby in the direction of flowing harmlessly past the piston - not in leakage past the packing.

A further object of the invention is to provide a new piston cylinder and rod packing assembly capable of eliminating the back pressure and piston lock problems.

Figure 4:
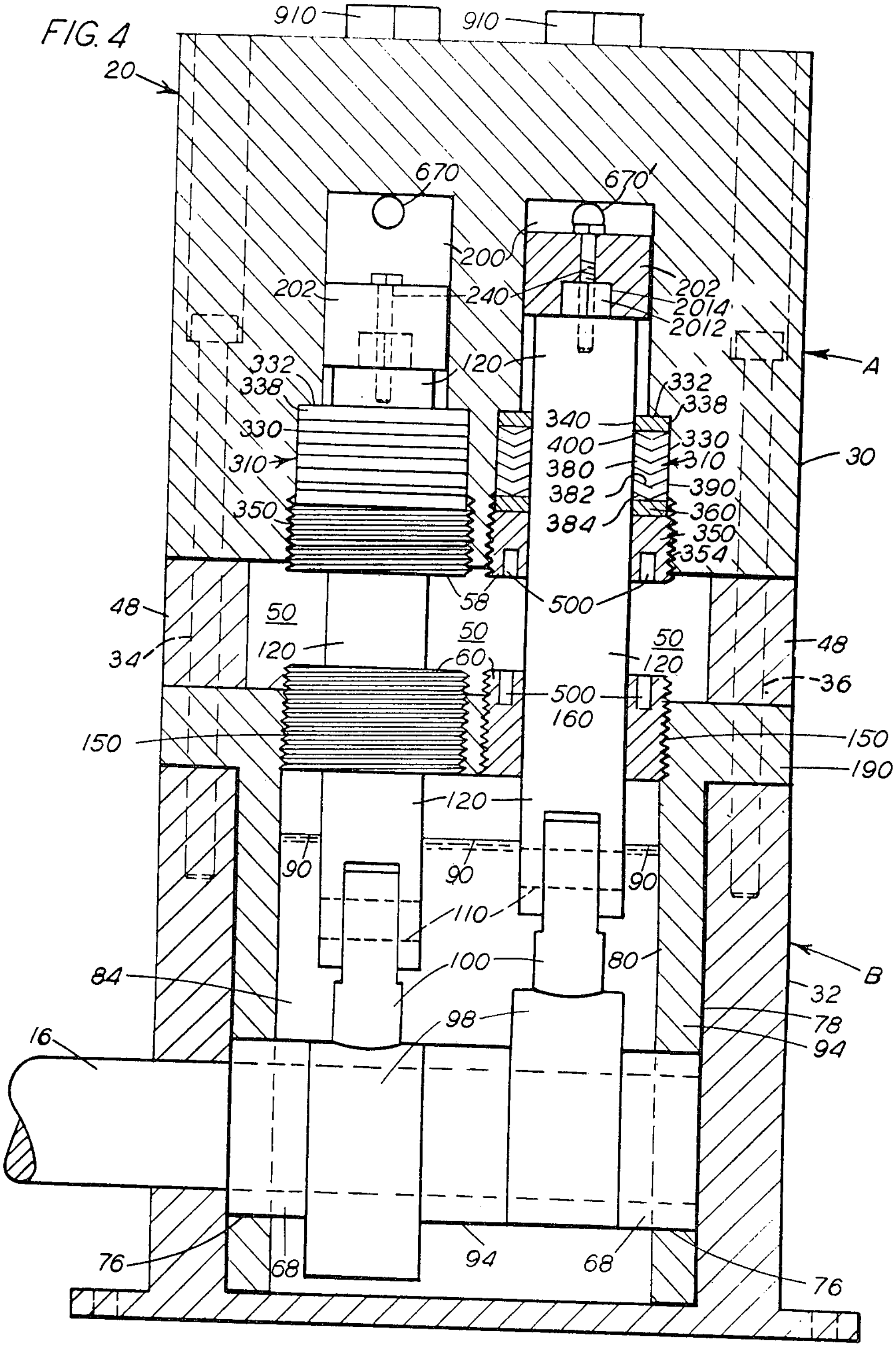
FIG. 4 is a sectional view taken along the line 4—4 of FIG. 3.

The valve blocks 30 and 32 are held apart by spacers 48, best seen in FIG. 4, and received in the bolts 34 and 36 whereby between the valve blocks 30 and 32 a space exists at 50, which is for the purpose of keeping upper plugs 58 apart from certain lower plugs 60 in order to keep any paint from the upper plugs 58 from mixing with oil from around the oil plugs 60 and vise versa, whereby the pump is divided into two complete separate upper and lower sections A and B. The section A being for handling paint and section B being oil-lubricated for paint transfer whereby the paint and oil are never mixed.

The shaft 16 enters the lower block 32 in which it is received in bearings 68 which are themselves maintained in position by an insert 74 receiving the bearings and openings 76.

The insert 74 has a cylindrical outer surface 78 and has a cylindrical inner surface 80 and has a hollow interior 84 which receives oil diagrammatically indicated at 90 for lubrication.

The shaft 16 is keyed by key 88 to two eccentric cams 96 which are themselves maintained in spaced apart position along the shaft 16 by means of a central spacer 94.

Around each eccentric cam 96 is a cylindrical yoke 98 to each of which a piston rod connector 100 is fixed, the connectors 100 being pivotally attached by pins 110 in the bifurcated lower end portions of piston rods 120.

Lower plugs 60 earlier mentioned are threaded on their exterior for fitting into threaded openings 150 in a top 160, which latter is a part of the insert 74 and the top 160 has a horizontal outwardly extending flange 190 extending outwardly above the lower block 32 and between it and the spacers 48, whereby pressure from the bolts 34 and 36 is adapted to press the top flange 190 into sealing relation with the bottom block 32.

The upper block 30 is provided with cylinder chambers 200 which latter are preferably cylindrical and receive therein cylindrical piston tips 202 which latter are fixed to the piston rods 120 by bolts 240.

Each piston tip 202 is formed of material of the type commonly called "self-lubricating"; an example of this type of material has the commercial brand name of "Teflon" and is manufactured by duPont, E. I. deNemours & Co., Inc., Wilmington, Delaware.

A self-lubricating plastic has a characteristic as compared with steel that resists corrosion, does not expand as readily under heat as metal, will not gald in sliding contact with metals as is common when two metals are in sliding contact.

It is a particular importance of such material that it does not expand as extensively under heat as does metal. This is important because the heat from friction of a piston has a considerable space with respect to the cylinder wall, because the metal paint pigment tends to maintain a frictional heat effect between a loose piston tip of my concept and the piston wall.

The high pressure under which a piston tip operates in a pump of this kind is itself a cause of high heat.

Because a self-lubricating piston does not expand as much as metal, it is, therefore, adapted to wear against the wall of the piston to a lesser extent.

It will be seen that if a metal tip were used for the part 202 then if the fit were loose enough there would be no contact between the tip and the cylinder wall and it would seem at first glance that for that reason there would be no friction and a metal tip would work. However, the friction resultant from the metal in the paint pigment would produce friction anyway, and the making of a metal piston tip to be of such loose tolerance that heat expansion would not effect it materially as regards friction would be less practical because the tolerance would then be so loose that the pumping power would be lessened.

A still more important reason for the piston tip 202 to be formed of a self-lubricated plastic as described is because such a material resists abrasion. It is my supposition that this resistance is due to a greater resiliency of the material than would be found in a soft or hard metal such as brass or iron. This is particularly important in a paint pump because the metallic paint pigment particles tend to abrade the piston tip.

Of all factors regarding the piston tip 202, the most important, however, is loose tolerance. I have found that a spacing of the piston tip with respect to the cylinder wall of approximately five-thousandths inch (.005) achieves a loose tolerance, that is loose enough to permit paint to bypass the piston tip 202 into the annular area 300 behind the piston during forward pumping strokes. This by-passing being harmless because of a sealing system later described, and this loose tolerance being desirable so that the abrading effect on the piston tip 202 by the metallic paint pigment particles is minimized so that the tip 202 can have a long life.

In my opinion, the closer the tolerance is between the tip 202 and the cylinder wall, the greater the wear which will come from the paint pigment metal particles. Therefore, it is my concept that a loose tolerance be used to minimize this wear.

Without deep thought, it would seem obvious that a loose tolerance would cause leakage past the piston tip 202 and would, therefore, result in loss of pumping pressure and an ineffective pump. However, on deeper thought, and through experimenting, I have discovered that it is possible to seal the cylinder around each piston 120 in a way that retains this pressure for providing an effective pump. The sealing is accomplished by a sealing assembly of my invention generally indicated at 310.

Such sealing assembly comprises a counterbore 330 into the upper valve block 30 for providing an annular shoulder 332 each of which is disposed in a plane at a right angle to the longitudinal axis of the respective piston 120.

Each sealing assembly further comprises an inner washer 338, having an inner opening 340 loosely fitting the respective piston 120. The washer 338 is preferably made of relatively stiff material.

A threaded plug 350 is received against threads 354 in the lower end of the counterbore 330 and each plug 350 is adapted to press against an outer washer 360 similar to the washer 338.

Between the washers 338 and 360 are a plurality of concave-convex sealing washers 380 which latter have in cross sections at each of their sides concave and preferably V-shaped surfaces 382, which latter are complementary shaped with respect to certain convex and preferably V-shaped outer surfaces 384 of each side of each washer 380, whereby the convex part of each washer is adapted to be vertical against the concave part of an adjacent washer.

After the plug is screwed into the counterbore 330, the concave-convex sealing washers 380 are pressed against each other and compressed between the washers 338 and 360, whereby their outer walls 380 and their inner walls 400 are spread apart respectively so as to press the washers 380 firmly against the piston rod 120.

I prefer that the washers 380 be made of material of the type called self-lubricating which is of greater resiliency than metal and of greater abrasion resistency than metal, the material preferred being "Teflon", whereby the brading effect on the piston 120 and on the sealing washers 380 by the metal pigment particles in the paint is minimized.

Teflon is often called a "self-lubricating material" and it wears long and well in minimizing the abrading effect on the piston 120 and seal washers 380 caused by metal pigment particles in paints. The washers 380, being V-shaped on each side, can be defined as annular washers, each of concavo-convex shape on any side thereof as seen in cross-section taken in a plane at a right angle to the axis of the reciprocation piston of the rod 120, which latter can be defined as the center axis extending longitudinally of the cylindrical rod 120.

Figure 7:
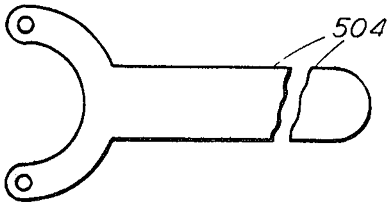
FIG. 7 is a detail showing a top plan view of an adjustment wrench for a bushing of the pump.

As best seen in FIG. 4, the undersurface of each of the plugs 58 as well as the upper surface of each of the plugs 60 are provided with diametrically opposed wrenching recesses 500 which are adapted to receive wrenching tips 502 which project from one side of a wrench 504, best shown in FIG. 7, for adjustment of the plugs 58 and of the pressure of the sealing washers 380 against the pistons 120. Periodical tightening of the plugs 58 to increase this pressure can be made as wear proceeds.

Referring to FIG. 3, it will be seen that paint enters each pumping cylinder 200 through passages 600 and 602 which latter are interconnected by a ball check valve assembly, generally indicated at 650. A second ball check valve assembly 660 interconnects a passage 670 and a passage 672.

With the passages 600 and 672 forming inlet and outlet connections by communication with the inner end of the cylinder 200, and with the passages 602 and 672 connected respectively to inlet hose 680 and outlet pipe 684, it will be seen that paint can be pumped from a paint reservoir 690 through the inlet hose 680 through the pump and out the outlet pipe 684 to a passage 694 in the bottom of the filter housing 698, the passage 694 leading to an opening 700 through a plug 702 plugging the bottom end of a filter chamber 708 in which a cylindrical filter 710 is provided.

The cylindrical filter is perforated, having openings as shown at 712 and paint flows through the passage 694, through the openings 700, into the interior of the filter 710 and out its sides into the filter chamber 708 and passes from the latter out an outlet pipe 720 as seen in FIG. 3, which latter, as seen in FIG. 1, is coupled at 724 to a flexible hose 726 leading to a spray nozzle assembly 730.

Figure 5:
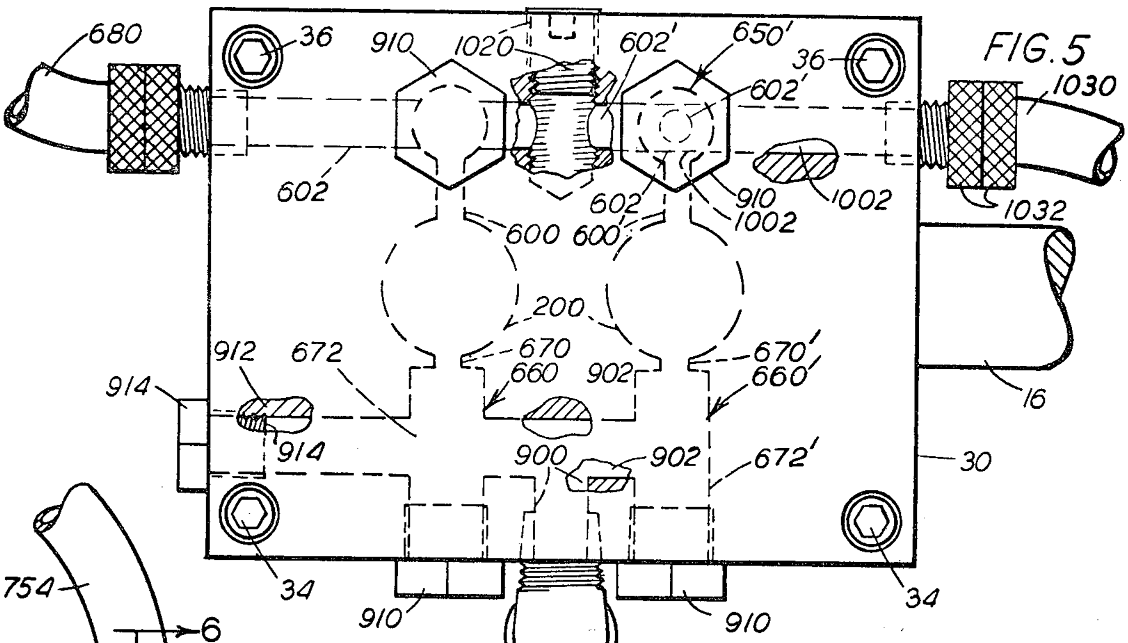
FIG. 5 is a top plan detailed view of the pump filter chamber, and release valve area of the invention, with parts shown in dotted lines.
Figure 5:
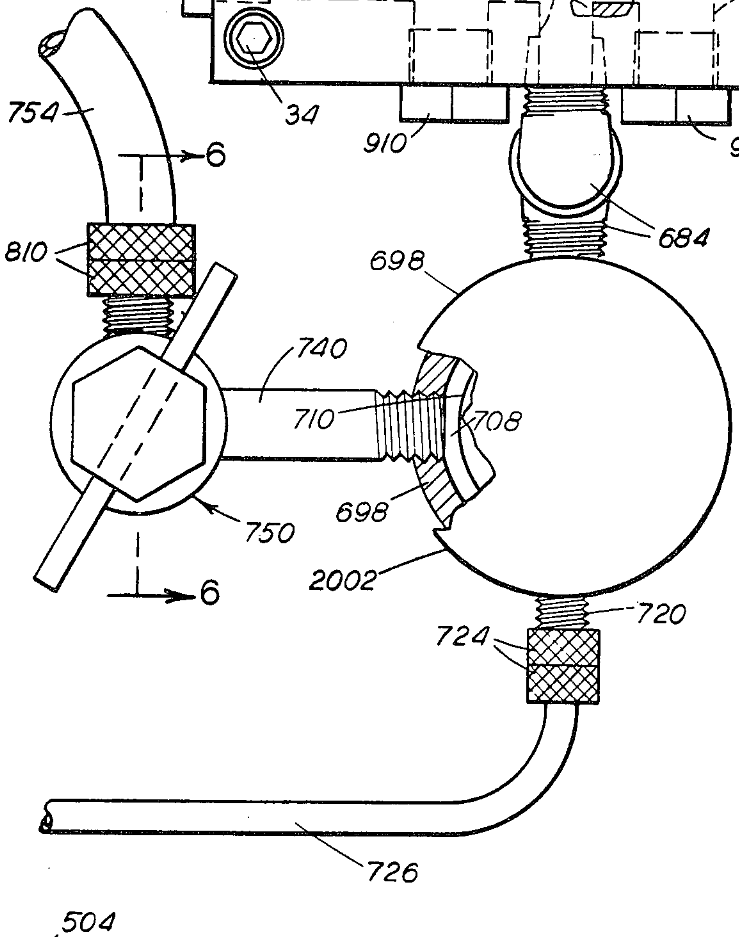

As best seen in FIG. 5, the filter housing 698 has a by-pass outlet 740 leading from its filter chamber 708 to a pressure control relief valve assembly 750, which latter is connected at its other side to a by-pass hose 754 which leads back to the paint receptacle 690 for the return of by-passed paint to the paint receptacle 690.

Figure 6:
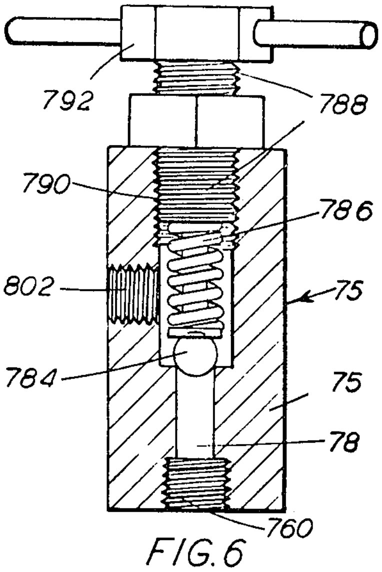
FIG. 6 is a sectional view taken along the line 6—6 of FIG. 5.
Figure 8:
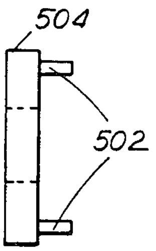
FIG. 8 is a view of the wrench in FIG. 7 as seen from the left-hand side in FIG. 7.

As best seen in FIG. 6, it will be seen that the pressure control relief valve assembly 750 has a valve block 755 provided with an inlet opening 760, which latter is connected by the pipe 740 with the filter assembly housing 698 for communication therethrough with the filter chamber 708.

The pressure control relief valve assembly 750 has a passage 780 leading from its opening 760 into a valve chamber 782 from which it is at times shut off by aa valve ball 784 held in place by a spring 786, the pressure of which is regulated by being pressed by a threaded control stem 788 received through a threaded opening 790 in the valve block 755, an outer end of the stem 788 having thereon a control handle 792 whereby pressure on the ball 784 can be varied for gaining a by-pass of selected amounts of paint, such by-pass being accomplished by a valve outlet opening 802 to which the hose 754 is interconnected by means of couplings 810, the latter best seen in FIG. 5.

The ball check valve assembly 650 above-described and associated passage ways 600 and 602 serve one of the cylinders 200. It will be seen that the other one of the cylinders 200 has a like passageway 600', a like ball check valve assembly generally indicated in dotted lines in FIG. 5 at 650' and has an outlet passageway 602' disposed in communication with the passageway 620 previously described.

Referring to FIGS. 3 and 5 it will be seen that the ball check valve 600 with its inlet passageway 670 and outlet passageway 672 serves one of the cylinders 600. A similar ball check valve assembly 660' with inlet passageway 670' and outlet passageway 672' are provided for the other cylinder 200.

The outlet passageway 670 and 672' are connected to a common outlet passageway 902 and the common outlet openings 902 are connected to a common outlet passageway 900 as best seen in FIG. 5.

It is the common outlet passageway 900 which is connected to the outlet pipe 684, as best seen in FIG. 5, each of the ball check valves 650 and 650', 660 and 660' are provided with plugs 910 which project outwardly from the valve block 30.

The common outlet opening 902 is made by a bore 912, best seen in FIG. 5, which is closed by a plug 914.

At times when catalyst materials are being used, it is desired to introduce a different component into each of the cylinders 200 and, as best seen in FIG. 5, this is accomplished by the provision of an auxiliary entrance passageway 1002 similar to the passageway 602 and leading through the valve block 30 forming its outer side to the inlet side of one of the check valve assemblies 650', the passageway 1002 having a relationship similar to the passageway 602 with respect to its valve check assembly 650.

The passageway 1002 opens onto the entrance passage 602' of valve 650'.

For applying catalystic materials a plug 1020 is inserted through the valve block 30 in position for blocking off that part of the passageway 602' which leads over to passageway 602, whereby the two cylinders 200 instead of receiving supply through the same hose 680 then receive separate supplies of two different materials, one through the hose 680 and the other through a hose 1030 affixed by couplings 1032 to the passageway 1002.

As thus described, the hose 680 can lead to a catalytic setting material which has no catalyst in it and the hose 630 can lead to a material that has a catalyst in it.

The outlets from each of the cylinders must be conducted in this fashion, then, as shown in FIG. 5, where instead of using a common outlet 902 of the passageway 900, is plugged by a plug that plugs off the passageway 902 wherein the outlet passageways 670 and 670' must then lead through means, not shown, to spray filter chambers 698, not shown, and to a separate pressure control relief valve assembly 650, not shown.

Referring to the platform 10, once more it will be seen that this has a handle 1200 having an upper portion 1202 which can be removed for facilitating the placing of the assembly in a car truck inasmuch as the remainder of the assembly is of a size adapted to fit into a car trunk.

A bracket 1210 on the upper portion of the handle 1202 and another bracket 1214 on the lower portion 1200 of the handle are intended for winding up a cord 1220 leading to a switch box 1224 of the model 10, for storing the cord. As such cords are very long, this storage facility is very handy in use.

In one experience in which the tolerance was substantially below one-thousandths (.001), I found that the piston tip stuck from heat expansion and needed to be replaced after only about thirty minutes of pumping.

The tolerance can vary with the viscosity of the material and have the same net result. However, materials with lacquer, for example, flow more readily than most paints, but for paints a tolerance of at least approximately one-thousandths is necessary to prevent sticking. For lacquers a tolerance of less than one-thousandths might work.

Common paint has more coarse pigment; whereas the pigment in lacquer is very finely ground. For exterior paint which is a heavy lead and oil paint, the viscosity is heavier and a tolerance of at least five-thousandths is needed for good results. This is why for a general principle machine, I prefer a tolerance of five-thousandths in order to attain the required loose fit which makes possible the by-passing effect earlier described which reduces wear from the friction of the metallic abrasion of paint pigment particles.

In operation, it will be seen that whenever one of the pistons 120 is on a forward pumping stroke the opposite pistion 120 will be on a return stroke whereby the pistons are synchronized for alternate pumping strokes. This has the effect of handling paint in a sufficient even flow for practical operation whereby an air compressor is unnecessary.

A partial paint flow evening effect is attained by providing the outlet pipe 730 of the filter chamber 698 in a position substantially below a certain top plug 2000 of the filter chamber, which latter is held in place by a top cap 2021 which latter is threadedly attached to the filter chamber housing 698, as best seen in FIG. 3.

In operation, a particular advantage will be found to come from the unique losse by-pass tolerance at the piston tip 202 for gaining long life without that excessive wearing of the piston tip which is characterized by the failure in the use of paint spraying machines of the prior art.

In operation, a further advantage will also be found to come from the use of the combination of sealing rings 310 held in compression against piston rods 120 by the plugs 58 for attaining a sealing without reliance upon a sealed effect at the piston tip 202 itself for providing a durable pump of long life.

It will be seen that piston tips 202 are removable being held on by bolts 240 having heads 2100 which extend through each piston tip 202 and are threadedly received in a respective piston rod 120.

Each piston rod 120 has a square upwardly projecting boss 2012 on its upper end, as best seen in FIG. 4, which is received in a square recess 2014 on the underside of each piston rod tip 202 whereby the tips 202 are held in alignment and prevented from rotation.

The pressure control release valve 750 has a particular importance when the valve of the spray gun 730 is shut off because it is then that line pressure under continued pumping would lead to line rupture. By-passing into the paint can 790 through the release valve 750 and hose 754 ordinarily does not occur during painting because of the strong spring 786 and the preferred fitting of the control 792.

Particular attention is drawn to the length of the stroke. The length of the stroke in my unit is substantially shorter than in units of the prior art now in conventional useage. For example, in conventional pumps an approximate 4-inch piston stroke is common. The piston stroke I prefer is three-fourths of an inch pumping stroke and three-fourths of an inch return stroke. Although a 1 inch stroke is almost equally satisfactory, yet dimension advantages would be experienced, I believe, as the stroke increases on up to a 3 inch stroke and very, very sharp dimension advantages on up to the 4 inch conventional stroke. I use the word "advantages" in this paragraph to distinguish from pumping volume. Pumping volume itself varies with r.p.m., revolutions per minute.

It will be seen that the pumping stroke could be further reduced in accordance with the principles of this invention to substantially below three-fourths inch stroke, for instance, one-half or one-fourth inch stroke. I have found, however, that with a three-fourths inch stroke a sufficient elimination of pulsation at the gun is achieved without a pressure accumulator between the pump and line and without a surge chamber between the pump and the line.

It is my belief that with long strokes, a greater amount of fluid is attempted to be suddenly rammed through the lines. This sudden ramming is no more sudden than the ramming in my pump, however, because I prefer to operate at 500 r.p.m. with a three-fourths of an inch stroke for each piston, with two pistons, and with a cylinder wall of fifteen-sixteenths of an inch diameter. Since conventional pumps of the compressed air-driven type with an approximate 4 inch stroke operate at approximately 180 r.p.m., it will be seen that with the greater stroke speed of my pump, the suddenness of the ramming of fluid into the line with each stroke would seem not to be lesser or even greater. However, apart from the suddenness is the question of volume per stroke. The volume from a 4 inch stroke would seem to be greater and it is my belief that the effect of this greater volume suddenly rammed into the line causes a frictional reistance with the walls of the line for a substantial distance ahead of the piston, this frictional resistance being substantially greater because of the greater volume per stroke.

In my pump, I prefer that the strokes be of much lesser length for causing a much lesser volume of suddenly rammed fluid to enter the lines per stroke, whereby a lesser quantity of fluid is suddenly accumulated, hence less frictional resistance per quantity of fluid pumped, since it is wellknown that turbulence and resistance increases greatly with greater amounts of fluid being suddenly moved.

I recognize that the hose 726 is resilient and yielding and that it functions to some extent as a pressure accumulator to the end that each pumping stroke does not cause an exactly proportional pulsation out at the spray gun 730 because of the yielding or expansion of the hose 726.

Of particular interest is the fact that in conventional pumps, a maximum effort is made to gain a tight sealing at the piston tip. This has resulted in long piston tips to provide support for a large area of sealing material surrounding the piston tip of conventional pumps.

In contrast, it is my intention to provide the piston tip with a looseness of fit so that the piston tip itself will last longer because of lesser abrasion as above described.

I avoid the use of an elongated constricted passageway through the piston as is characteristic of the conventional pumps that are designed to pump and fill the chamber on the forward stroke and pump and fill a chamber on the rearward stroke. My pump pumps only on the forward stroke and fills the chamber only on the rearward stroke, and therefore, will function with a piston tip as I have described without an elongated constricted passageway through it, as is made possible by the elimination of a long piston tip, the latter being made possible by the presence of large piston sealing areas.

It might be said that my pump operates "by giving a little". In each pumping stroke there is a fluid by-passing of the piston tip and this in turn leads to the elimination of a long constricted passageway through a piston tip as makes for a large resistance in the prior art pumps and reduces pumping efficiency.

As will be seen in FIG. 3 and FIG. 4, the outlet passages 670 and 670' of the outlet valves 660 and 660' are not substantially smaller than the inlet passages 600 and 600' of the inlet valves 650 and 650' of the respective cylinders, and that the passages 600 and 600' and the passages 670 and 670' substantially represent the most constricted parts of the lines incoming and outgoing to and from the respective cylinders, whereby the new pump has an efficiency from restrictions, made possible because of its general design.

It will be seen that my filter chamber 708 could function as a pressure accumulator because of air under pressure in it. However, this effect is at a minimum, and almost absent, because of its small size and because of the preferred fitting of the pressure release valve 750.

I have found, however, that there is substantially no visible surge or pulsation in the flow out through the pipe 684 when the filter assembly and the hose 726 are entirely removed during pumping.

In operation, a further effect of the loose fit of the piston tip 202 will be found, namely, that during a return or filling stroke, there will be a lesser resistance to liquid disposed behind the piston tip to pass by the piston tip once more and into the area closer to the outlet opening 670 than to press past the sealing washers 380 because there will be a greater looseness at the piston tip than at the sealing washers 380. This is in contrast to the sealing principle of the prior art for in that principle there is a greater pressure on the seals which are equivalent to the sealing washers 380 whereby such a sealing area becomes filled with abrasive paint pigment leading to early leakage from wear and need for shut-down of a pump for seal replacement.

In operation, my pump as described, is able to deliver three and one-half gallons per minute of free-flow with the filter assembly 698 and hose 726 disconnected.

In the prior art pumps of the type which pump during both forward and return strokes, seals which are equivalent to the sealing washers 380 in FIG. 4 are under high pressure because a tight fitting piston tip rams fluid directly against them during both forward and return strokes. However, in my pump the sealing washers 380 are behind the piston during its pumping stroke where they are portected from such pumping pressure. Although they are subjected to some pressure during the return stroke of my piston, yet the loose fit permits dissipation of the pressure behind the piston without forcing paint deeply into the sealing assembly 310.

It will be seen that more than two cylinders can be used within the principles of this invention, to the end that one of the chief characteristics of my pump is that it uses multiple cylinders.

It will be seen that although a minimum tolerance of one-thousandths of an inch is recommended for pumping thinner liquids, yet a tolerance of a fiftieth of one-thousandths of an inch will gain very substantial improvement in comparison therewith as measured by the durability of piston tip under abrasion from pigment.

I claim:

1. A paint spraying assembly comprising: a paint spraying gun having an outlet orifice of a size for causing a paint flow to spread out into a spray, a pump having an inlet and an outlet, a conduit means interconnecting said gun and said pump outlet, a source of paint containing abrasive particles, conduit means connecting said source of paint with said pump inlet, a block having a pumping chamber therein having a chamber wall having a piston rod opening therethrough, an elongated piston rod means partly disposed in said chamber and extending through said piston rod opening and reciprocating along an axis, a teflon sealing assembly substantially sealing and filling the area between the walls of said piston rod opening and said piston rod means, that portion of said rod means which lies inwardly of said sealing assembly having a portion of maximum cross-sectional area as taken transversely of said piston rod means, said rod means portion having a sufficiently loose fit with respect to adjacent portions of said chamber wall as to substantially prolong the life of said portion of said rod means by reducing the abrasion of the rod means portion by abrasive particles disposed between said rod means portion and said chamber wall, said looseness of fit between said rod means portion and said chamber wall resulting in a by-passing of said rod means portion by paint, said fit being sufficiently close, however, as to provide substantial and effective pump pressure, said looseness of fit assuring a long working life before abrasion of said rod means portion causes need for its replacement, whereby said pump is free of any means therein allowing lubricating fluid to mix with paint therein in quantities such that said paint when it leaves said pump is substantially damaged in its drying characteristics.

2. The paint spraying assembly of claim 1 in which said sealing means comprises a plurality of annular washers each of a concavo-convex shape on any side thereof as seen in cross-section taken in a plane at a right angle to said axis of reciprocation of said rod means.

3. The paint spraying assembly of claim 1 in which the tolerance of said loose fit between said piston rod means portion and said chamber wall is of sufficiently close fit to gain a practical amount of pumping rate and is defined as being such that all sides of said piston rod means portion are spaced from said chamber wall at least one-fiftieth of one-thousandths of an inch.

4. The paint spraying assembly of claim 1 in which said sealing means comprises a plurality of annular washers each of a concavo-convex shape on any side thereof as seen in cross-section taken in a plane at a right angle to said axis of reciprocation of said rod means, said sealing means being annular, and said sealing means comprising means for compressing said annular means to cause it to tightly engage said rod means, and in which the tolerance of said loose fit between said piston rod means portion and said chamber wall is of sufficiently close fit to gain a practical amount of pumping rate and is defined as being such that all sides of said piston rod means portion are spaced from said chamber wall at least one-fiftieth of one-thousandths of an inch.

5. The paint spraying assembly of claim 1 in which said sealing means comprises a plurality of annular washers each of a concavo-convex shape on any side thereof as seen in cross-section taken in a plane at a right angle to said axis of reciprocation of said rod means, said sealing means being annular, and said sealing means comprising means for compressing said annular means to cause it to tightly engage said rod means, and in which the tolerance of said loose fit between said piston rod means portion and said chamber wall is of sufficiently close fit to gain a practical amount of pumping rate and is defined as being such that all sides of said piston rod means portion are spaced from said chamber wall at least approximately one-thousandths of an inch.

* * * * *